United States Patent [19]

Goyal et al.

[11] 4,090,217

[45] May 16, 1978

[54] AUTOMATIC SHARPNESS CONTROL CIRCUIT FOR A TELEVISION RECEIVER

[75] Inventors: Shri K. Goyal; Leo I. Bluestein, both of Bedford, Mass.

[73] Assignee: GTE Laboratories Incorporated, Waltham, Mass.

[21] Appl. No.: 716,604

[22] Filed: Aug. 23, 1976

[51] Int. Cl.² .......................... H04N 9/535; H04N 5/14
[52] U.S. Cl. ........................................ 358/37; 358/166
[58] Field of Search .............. 358/166, 162, 174, 184, 358/37–40; 325/362; 361/56; 307/320

[56] References Cited

U.S. PATENT DOCUMENTS

| 2,514,112 | 7/1950 | Wright et al. | 358/166 |
| 3,495,031 | 2/1970 | Poppa | 358/174 |
| 3,693,094 | 9/1972 | Kanamaru et al. | 358/191 |
| 3,706,846 | 12/1972 | Siwko | 358/184 |
| 3,931,637 | 1/1976 | Carpenter | 358/38 |

*Primary Examiner*—John C. Martin
*Attorney, Agent, or Firm*—Robert E. Walrath

[57] ABSTRACT

An automatic sharpness control circuit for a color television receiver, wherein a filter having a variable filtering characteristic establishes the peaking of the frequencies forming the video signal, includes a varactor diode as the control element for the variable characteristic filter. The automatic gain control signal establishes the bias condition of the varactor diode so that the extent of peaking in the frequencies forming the video signal is automatically reduced as the strength of the video signal decreases. Accordingly, a balancing effect is created between desirable picture sharpness and the degrading effect of accentuated picture noise.

8 Claims, 1 Drawing Figure

U.S. Patent   May 16, 1978   4,090,217
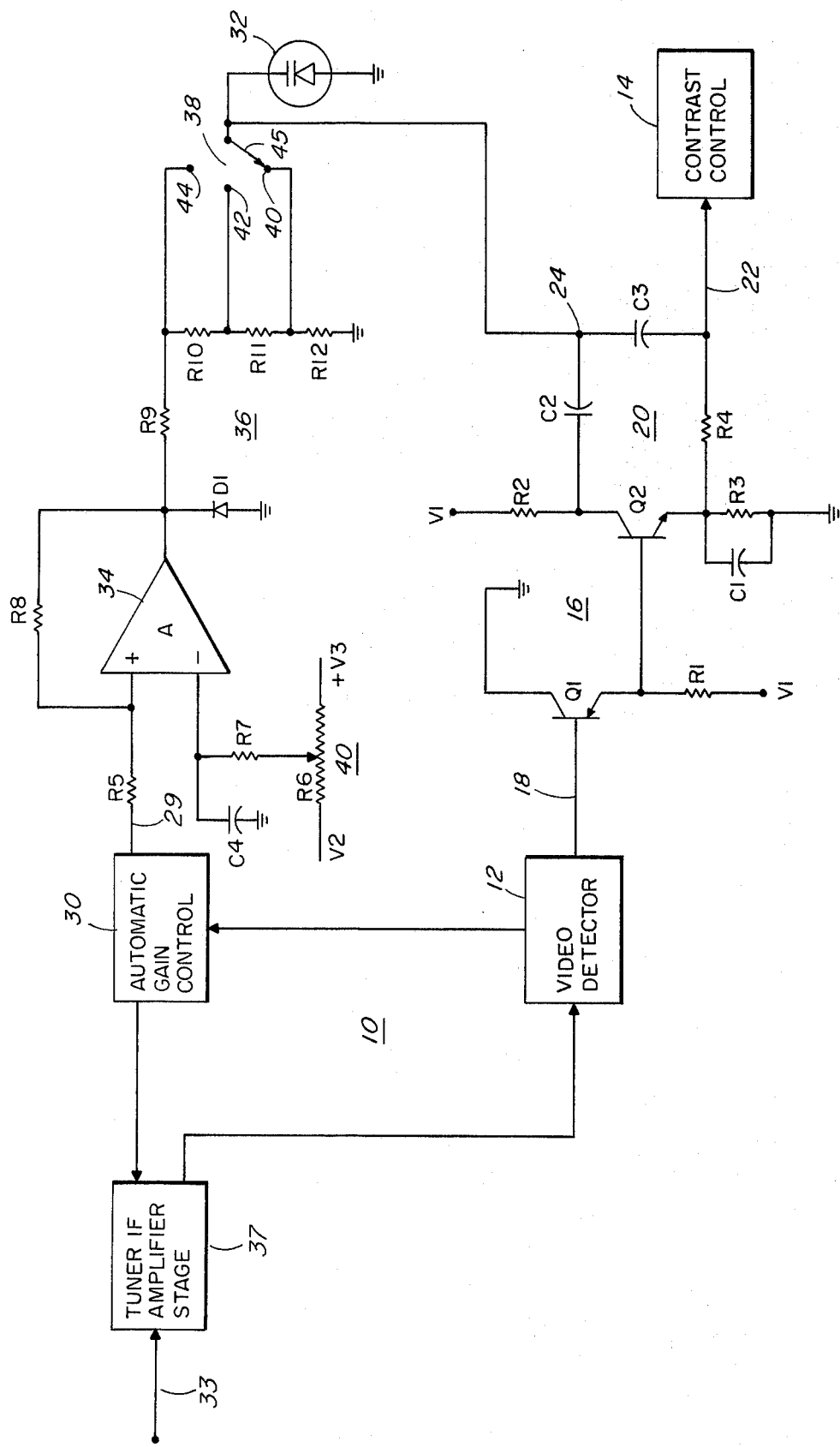

AUTOMATIC SHARPNESS CONTROL CIRCUIT FOR A TELEVISION RECEIVER

BACKGROUND OF THE INVENTION

The present invention relates to a sharpness control circuit for a color television receiver.

The appearance evaluation of the picture image in terms of the edge characteristic of objects is usually identified by the term "sharpness." The more clearly defined the line which separates dark areas from lighter ones, the greater the sharpness of the picture. Picture quality can be improved by over-emphasizing the brightness transitions, thus improving the apparent contrast and sharpness of the picture.

Many of the presently known television receivers provide a manual preference control for selecting the degree of picture sharpness, the sharpness being changed by peaking the video frequency response around 2.5 MHz. In one known sharpness control circuit, the manual preference control switch introduced one of a plurality of fixed value capacitors in a filter for a video signal to establish a certain frequency response for the video signal. This type of control circuit has been successful in its purpose which is to permit the selection of the degree of sharpness which is subjectively preferable to the viewer. However, this and other known sharpness control circuits do have features which limit their more widespread use and effectiveness. A fixed amount of peaking added is generally not optimum for all the different television stations serving an area. The optimum subjective setting is a function of the receiver location, antenna and the fine tuning of the television receiver. The additional peaking requirements are also dependent on the varying amount of crispening introduced by studio personnel who subjectively judge the quality of the picture sent out for transmission. Furthermore, the known sharpness control circuits cannot distinguish signal from noise, and therefore, while building up the sharp edges in the picture, the circuit also accentuates the granular noise. This appears as snow in the picture. The noise accentuation effect is most apparent for weak channels and for such channels, the reproduced picture may appear too noisy and less appealing.

SUMMARY OF THE INVENTION

It is an object of the present invention to provide an automatic control of the degree of picture sharpness, thus avoiding the noise accentuation in the case of low signal power while at the same time providing a selectable control for the preference of the viewer.

It is another object of the present invention to provide a sharpness control circuit in which the viewer may select the preferred picture sharpness without being concerned about the noise performance of the receiver at low signal levels. This object is important because such a manual control is normally located by receiver manufacturers at the back of television receivers and it is not considered desirable to add the control to the more basic controls easily accessible from the front of the receiver.

An additional object of the invention is to provide a sharpness control circuit permitting the receiver to automatically select the desirable trade-off between the picture sharpness and picture noise.

It is still an additional object of the invention to provide a sharpness control circuit having flexibility and ease in the adjustment in the point at which actuation of the automatic sharpness control feature assumes control.

According to the present invention there is provided an improvement in a sharpness control circuit for a color television receiver. The television receiver is of the type having a variable frequency response device for processing a demodulated video signal to establish the peaking of the response in frequency to the video signal and a device for selecting one of a plurality of predetermined characteristics of the frequency response device to provide selective peaking of the frequencies comprising the video signal thereby to vary the sharpness of the picture. According to the invention, there is provided a device for establishing a controlled range of characteristics for at least one of the plurality of selected predetermined characteristics for the device in inverse relation to the strength of the received signal. Accordingly, the extent of peaking of the frequencies of the VHF or UHF signal is automatically reduced as the strength of the video signal is reduced, thereby providing a balancing effect between desirable picture sharpness and the degrading effect of accentuated noise in the picture. Preferably, the variable frequency response device includes a video amplifier for amplifying the demodulated video signal and a filter having a variable filtering characteristic coupled to the output of the video amplifier. The device for establishing the controlled range includes a variable reactive impedance element coupled to the other elements of the filter by the selecting device. This element has a magnitude of reactive impedance which is related to the magnitude of a bias signal coupled across the element. An automatic gain control voltage coupled to the reactive impedance device defines the bias signal. In the preferred embodiment, the reactive impedance element is a varactor diode.

BRIEF DESCRIPTION OF THE DRAWINGS

In the drawing:

The sole FIGURE is a schematic diagram of an automatic sharpness control circuit according to the present invention.

DESCRIPTION OF PREFERRED EMBODIMENTS

In an exemplary embodiment of the present invention, as indicated in the FIGURE, there is provided an improvement in a sharpness control circuit, represented generally by the reference numeral 10, for use in a color television receiver. The television receiver is of the type having a variable frequency response device for processing a demodulated video signal from video detector 12. This device establishes the peaking of the frequencies comprising the video signal prior to its being coupled to the remaining portions of the television receiver, such as a contrast control 14. In the exemplary embodiment, the variable frequency response device includes a video amplifier 16 for amplifying the demodulated video signal at input line 18 and a filter, represented generally by the reference numeral 20, having a variable filtering characteristic. The filter 20 is coupled to the output of the video amplifier 16. The amplifier 16 has a buffer amplifier stage which includes a transistor Q1 whose base is coupled to the output of the video detector 12, whose collector is coupled to ground and whose emitter is coupled to a bias voltage source of V1 bolts via a resistor R1. The output of this amplifier is taken from the emitter of the transistor Q1 and is coupled to the base of a transistor Q2 whose collector is coupled to the bias voltage V1 via a resistor R2 and whose emitter is coupled to ground via the parallel combination of a capacitor C1 and a resistor R3. The variable characteristic filter 20 has an output at 22 which is coupled to the contrast control 14. The filter includes a capacitor C2 coupled between the collector of the transistor Q2 and a junction point 24 and a capacitor C3 coupled between the junction point 24 and the output of the filter at 22. A resistor R4 is coupled between the emitter of the transistor Q2 and the output of the filter 20 at 22. In operation, the signal at 22 is a combination of that present at the emitter of Q2 via resistor R4 and that present at the collector of Q2 via the capacitors C2 and C3. Thus, it may be observed that by changing the characteristic of the filter 20 by altering the value of the capacitance between junction point 24 and ground any desired combination of the video signal may be obtained thus altering the peaking of the frequencies of the demodulated video signal. In a known sharpness control circuit, the peaking of the frequencies is obtained by introducing one of a plurality of fixed value capacitors between the junction 24 and ground to alter the filtering characteristic of the filter 20.

According to the invention, the improved sharpness control circuit includes a device for establishing a controlled range of characteristics for at least one of the selected predetermined characteristics for the filter in inverse relation to the AGC voltage at an output 29 of an automatic gain control circuit 30 so that the extent of peaking of the frequencies comprising the video signal is automatically reduced as the strength of the signal at an input 33 of a tuner IF amplifier stage 37 is reduced. Accordingly, there is provided a balancing effect between desirable picture sharpness and the degrading effect of accentuated noise in the picture. The device for this controlled range includes a variable reactive impedance element adapted to be coupled to the other elements of the filter 20, the element having a magnitude of reactive impedance which is related to the magnitude of a bias signal coupled across it. The dc voltage at 29 from the automatic gain control circuit 30 is coupled to the element to define the bias signal for the control of the reactive impedance element. In the embodiment, the reactive impedance element is a capacitive reactive impedance element, and preferably this element is a varactor diode 32. The coupling of the dc voltage is carried out via an amplifier 34 which amplifies the gain control voltage to a useable level and a voltage divider network, represented generally by the reference numeral 36 for establishing a fixed plurality of signals, which are a predetermined fraction of the instantaneous amplified gain control voltage. A switch 38 is adapted to select one of the fixed plurality of fractionalized portions of the gain control voltage and to couple the selected voltage to the varactor diode. The switch 38 is illustrated as having contacts 40, 42 and 44 and an arm element 45. In addition, a device such as a diode D1 provides a shunt path for the gain control signal away from the varactor diode 32 if the polarity of the control signal becomes such as to forward bias the varactor diode.

In addition, in another feature of the invention, the automatic sharpness control circuit has the capability for establishing a threshold level for the gain control voltage below which the gain control voltage does not control the sharpness of the picture. In the embodiment, this feature is carried out by the amplifier 34 being a differential amplifier with the gain control signal being coupled to a negative input terminal via a resistor R5. The positive input of the differential amplifier 34 has coupled thereto a threshold signal which is subtracted from the gain control signal. Preferably, this threshold signal is established by a voltage divider 40 comprising a variable resistor R6 coupled between voltages designated V2 and V3. A resistor R7 is coupled between the wiper arm of the divider 40 and the positive input terminal of the amplifier 34. A capacitor C4 is coupled between the positive input and ground. Preferably, the amplifier 34 is an operational amplifier and includes a feedback resistor R8 coupled between the output and the negative input. The voltage divider network 36 includes resistors R9, R10, R11 and R12 coupled in series between the output of the amplifier 34 and ground.

The following summarizes the values of the various components illustrated in the exemplary embodiment.

| R1 | 4.7 KΩ | R7 | 560 KΩ | C1 | 150 pf |
|----|--------|----|--------|----|--------|
| R2 | 1.0 KΩ | R8 | 5.6 MΩ | C2 | 270 pf |
| R3 | 470 Ω | R9 | 100 KΩ | C3 | 820 pf |
| R4 | 470 Ω | R10 | 150 KΩ | C4 | 470 pf |
| R5 | 560 KΩ | R11 | 27 KΩ | amplifier 34 | Analog Dev. AD518 |
| R6 | 50 KΩ | R12 | 20 KΩ | varactor diode | Alpha Industries AL6518 |
| | | | | V1 | +24 v |
| | | | | V2 | +15 v |
| | | | | V3 | −15 v |
| | | | | D1 | IN914 |

In operation, the varactor diode 32 provides a value of capacitance between the junction 24 and ground selected by an appropriate voltage tapping by means of the switch 38. For automatic sharpness control, this voltage is made to vary as a function of the AGC voltage in the television receiver. Thus, a change in the signal strength causes a change in the voltage across the varactor diode 34 and thus, its capacitance is altered. The polarity of the voltage changes are chosen such that a decrease in signal strength increases the varactor capacitance, thereby decreasing the video peaking and the noise accentuation effect.

The embodiment of the present invention is intended to be merely exemplary and those skilled in the art shall be able to make numerous variations and modifications of it without parting from the spirit of the present invention. In its broadest aspect, the invention relates to the concept of controlling the video peaking as a function of the signal strength at the tuner input. This same result may also be achieved by using a variable gain sharply peaked amplifier in the video amplifier chain and by adding the output of this amplifier to the output from an amplifier with a flat frequency response. The gain of the amplifier with the peaked response can be controlled as a function of the signal strength. The same end result can be obtained by an IF amplifier with a peaked frequency response. By changing the gain of this amplifier as a function of signal strength, the overall frequency response of the multistage IF chain can be peaked. However, the advantage of the embodiment illustrated in the FIGURE is that it is relatively uncomplicated to fabricate, involves only a few components and is stable in operation. All such variations and modifications are intended to be within the scope of the present invention as defined by the appended claims.

We claim:

1. A sharpness control circuit for a color television receiver of the type having a variable frequency response device for processing a demodulated video signal to establish the peaking of the frequencies including the video signal, said variable frequency response device including an input for receiving said demodulated video signal, an output for providing said demodulated video signal, and a control terminal, the improvement comprising a voltage controlled reactive impedance element connected to said control terminal for varying the frequency response of said device; a voltage divider; manually operable switch means connected to said voltage divider and to said reactive impedance element for selectively connecting predetermined portions of said voltage divider in parallel with said reactive impedance element; and coupling means connected to said voltage divider and to a gain control circuit in said television receiver for providing a gain control voltage across said voltage divider in response to the signal strength of a video signal received by said television receiver, said coupling means including an amplifier for amplifying the gain control voltage to a usable level and means for establishing a threshold level for the gain control voltage below which the gain control voltage does not control the sharpness of the picture.

2. The improvement according to claim 1 wherein the variable frequency response device includes:
   (a) a video amplifier for amplifying the demodulated video signal, and
   (b) a filter having a variable filtering characteristic coupled to the output of the video amplifier.

3. The improvement according to claim 1 wherein the reactive impedance element is a capacitive reactive impedance element.

4. The improvement according to claim 3 wherein the capacitive reactive impedance element is a varactor diode.

5. The improvement according to claim 4 wherein the coupling means includes means providing a shunt path for the gain control voltage away from the varactor diode if the polarity of the control voltage becomes such as to forward bias the varactor diode.

6. The improvement according to claim 5 wherein the shunt path means includes a diode coupled with respect to the varactor diode in the same conduction sense.

7. The improvement according to claim 1 wherein the threshold level establishing means includes:
   (a) the gain control voltage amplifier being a differential amplifier, the gain control circuit being coupled to one input thereof, and
   (b) means generating a threshold voltage connected to another input of the differential amplifier.

8. The improvement according to claim 7 wherein the threshold voltage generating means includes a voltage divider adapted to provide a selectable dc voltage level.

* * * * *